(12) United States Patent
Bloomfield et al.

(10) Patent No.: US 7,555,529 B2
(45) Date of Patent: *Jun. 30, 2009

(54) INTERACTING WITH SOFTWARE APPLICATIONS DISPLAYED IN A WEB PAGE

(75) Inventors: Marc Bloomfield, Lighthouse Point, FL (US); Jeff Muir, Delray Beach, FL (US); Anatoly Panasyuk, West Ryde (AU); Elias C. Behrakis, Dracut, MA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1179 days.

This patent is subject to a terminal disclaimer.

(21) Appl. No.: 10/288,821

(22) Filed: Nov. 6, 2002

(65) Prior Publication Data

US 2003/0063119 A1 Apr. 3, 2003

Related U.S. Application Data

(60) Division of application No. 10/068,461, filed on Feb. 6, 2002, now Pat. No. 6,950,991, which is a continuation-in-part of application No. 09/086,898, filed on May 29, 1998, now Pat. No. 6,437,803, and a continuation-in-part of application No. 09/247,220, filed on Feb. 10, 1999, now Pat. No. 6,370,570, and a continuation-in-part of application No. 08/855,977, filed on May 14, 1997, now Pat. No. 6,370,552, which is a continuation of application No. 08/556,623, filed on Nov. 13, 1995, now Pat. No. 6,088,515.

(51) Int. Cl.
*G06F 15/16* (2006.01)

(52) U.S. Cl. .................. 709/217; 709/203; 709/219

(58) Field of Classification Search .................. 709/227, 709/232, 203, 237, 217, 219; 395/157, 154, 395/275, 200; 340/716

See application file for complete search history.

(56) References Cited

U.S. PATENT DOCUMENTS 4,387,425 A 6/1983 El-Gohary .................. 364/200

(Continued)

FOREIGN PATENT DOCUMENTS

EP 0381645 A2 8/1990

(Continued)

OTHER PUBLICATIONS

IBM Technical Disclosure Bulletin, Mar. 1993, U.S, Volime # 36, Issue # 3, pp. 421-426, Corss Reference 0018-8689-36-3-421.*

(Continued)

*Primary Examiner*—Larry D Donaghue
*Assistant Examiner*—Asghar Bilgrami
(74) *Attorney, Agent, or Firm*—Choate Hall & Stewart, LLP

(57) ABSTRACT

The invention enables the display of application-output data within application-output windows embedded in a web browser window. The application-output windows can be dynamically moved, resized and otherwise manipulated within the web browser window even when the application program providing the source of the application-output data is non-web enabled (e.g., legacy applications). The invention receives window attribute information associated with the application-output windows via a first virtual channel and displays application-output data received via a second virtual channel within the application-output windows, which are formed and/or modified using the window attribute information.

31 Claims, 6 Drawing Sheets

U.S. PATENT DOCUMENTS

| | | | |
|---|---|---|---|
| 4,499,499 A | 2/1985 | Brickman et al. ............ 358/263 |
| RE32,632 E | 3/1988 | Atkinson .................... 340/709 |
| 4,779,189 A | 10/1988 | Legvold et al. ............. 364/200 |
| 4,860,247 A | 8/1989 | Uchida et al. ............... 364/900 |
| 4,887,204 A | 12/1989 | Johnson et al. ............. 364/200 |
| 4,903,218 A | 2/1990 | Longo et al. ................ 364/521 |
| 4,937,036 A | 6/1990 | Beard et al. ................ 340/706 |
| 4,937,784 A | 6/1990 | Masai et al. ................ 364/900 |
| 4,949,281 A | 8/1990 | Hillenbrand et al. ........ 364/518 |
| 4,958,303 A | 9/1990 | Assarpour et al. ........... 364/521 |
| 4,974,173 A | 11/1990 | Stefik et al. |
| 5,014,221 A | 5/1991 | Mogul ........................ 364/519 |
| 5,031,089 A | 7/1991 | Liu et al. ..................... 364/200 |
| 5,062,060 A | 10/1991 | Kolnick |
| 5,072,412 A | 12/1991 | Henderson, Jr. et al. ..... 395/159 |
| 5,103,303 A | 4/1992 | Shoji et al. .................... 358/75 |
| 5,119,319 A | 6/1992 | Tanenbaum ................. 364/514 |
| 5,155,847 A | 10/1992 | Kirouac et al. .............. 395/600 |
| 5,175,852 A | 12/1992 | Johnson et al. ............. 395/600 |
| 5,187,790 A | 2/1993 | East et al. .................... 395/725 |
| 5,202,971 A | 4/1993 | Henson et al. .............. 395/425 |
| 5,204,897 A | 4/1993 | Wyman ........................ 380/4 |
| 5,204,947 A * | 4/1993 | Bernstein et al. ............ 345/854 |
| 5,231,697 A | 7/1993 | Yamada ...................... 395/142 |
| 5,233,701 A | 8/1993 | Nakata ........................ 395/425 |
| 5,241,625 A | 8/1993 | Epard et al. ................. 395/163 |
| 5,247,683 A | 9/1993 | Holmes et al. .............. 395/700 |
| 5,249,290 A | 9/1993 | Heizer ......................... 395/650 |
| 5,255,361 A | 10/1993 | Callaway et al. |
| 5,305,440 A | 4/1994 | Morgan et al. .............. 395/200 |
| 5,309,555 A | 5/1994 | Akins et al. ................. 395/157 |
| 5,315,711 A * | 5/1994 | Barone et al. ............... 709/208 |
| 5,325,527 A | 6/1994 | Cwikowski et al. ......... 395/650 |
| 5,329,619 A | 7/1994 | Page et al. ................... 395/200 |
| 5,341,477 A | 8/1994 | Pitkin et al. ................. 395/200 |
| 5,341,478 A | 8/1994 | Travis, Jr. et al. ........... 395/200 |
| 5,351,129 A | 9/1994 | Lai .............................. 348/584 |
| 5,367,688 A | 11/1994 | Croll ........................... 395/700 |
| 5,414,457 A | 5/1995 | Kadowaki et al. ............. 348/14 |
| 5,440,719 A | 8/1995 | Hanes et al. ................. 395/500 |
| 5,457,797 A | 10/1995 | Butterworth et al. ........ 395/650 |
| 5,461,608 A | 10/1995 | Yoshiyama ................. 370/16.1 |
| 5,469,540 A | 11/1995 | Powers, III et al. ......... 395/158 |
| 5,473,599 A | 12/1995 | Li et al. ......................... 370/16 |
| 5,483,466 A | 1/1996 | Kawahara et al. ........... 364/514 |
| 5,485,460 A | 1/1996 | Schrier et al. .............. 370/94.1 |
| 5,499,343 A | 3/1996 | Pettus ...................... 395/200.2 |
| 5,515,508 A | 5/1996 | Pettus et al. ............. 395/200.01 |
| 5,517,617 A | 5/1996 | Sathaye et al. ........... 395/200.1 |
| 5,526,492 A | 6/1996 | Ishida ..................... 395/200.09 |
| 5,530,852 A | 6/1996 | Meske, Jr. et al. ........... 395/600 |
| 5,537,546 A | 7/1996 | Sauter ..................... 395/200.01 |
| 5,537,548 A | 7/1996 | Fin et al. ................. 395/200.04 |
| 5,541,927 A | 7/1996 | Kristol et al. .............. 370/94.2 |
| 5,548,726 A | 8/1996 | Pettus ..................... 395/200.09 |
| 5,553,242 A | 9/1996 | Russell et al. ........... 395/200.12 |
| 5,557,732 A | 9/1996 | Thompson .................. 395/161 |
| 5,557,748 A | 9/1996 | Norris ..................... 395/200.1 |
| 5,561,769 A | 10/1996 | Kumar et al. .......... 395/200.05 |
| 5,566,302 A | 10/1996 | Khalidi et al. ......... 395/200.09 |
| 5,572,643 A | 11/1996 | Judson ....................... 395/793 |
| 5,572,674 A | 11/1996 | Ernst ....................... 395/200.1 |
| 5,574,934 A | 11/1996 | Mirashrati et al. |
| 5,579,469 A | 11/1996 | Pike ............................ 395/326 |
| 5,583,563 A | 12/1996 | Wanderscheid et al. ....... 348/13 |
| 5,583,992 A | 12/1996 | Kudo ...................... 395/200.03 |
| 5,586,312 A | 12/1996 | Johnson et al. ............. 395/610 |
| 5,592,626 A | 1/1997 | Papadimitriou et al. 395/200.09 |
| 5,594,490 A | 1/1997 | Dawson et al. ................ 348/6 |
| 5,596,745 A | 1/1997 | Lai et al. .................... 395/614 |
| 5,606,493 A | 2/1997 | Duscher et al. ............. 364/134 |
| 5,619,716 A | 4/1997 | Nonaka et al. .............. 395/800 |
| 5,623,656 A | 4/1997 | Lyons ........................ 395/610 |
| 5,644,720 A | 7/1997 | Boll et al. ............... 395/200.12 |
| 5,657,390 A | 8/1997 | Elgamal et al. ................ 380/49 |
| 5,680,549 A | 10/1997 | Raynak et al. ......... 395/200.12 |
| 5,701,451 A | 12/1997 | Rogers et al. ............... 395/600 |
| 5,706,437 A | 1/1998 | Kirchner et al. ........ 395/200.12 |
| 5,708,786 A | 1/1998 | Teruuchi |
| 5,710,918 A | 1/1998 | Lagarde et al. ............. 395/610 |
| 5,721,876 A | 2/1998 | Yu et al. ...................... 395/500 |
| 5,734,865 A | 3/1998 | Yu .............................. 395/500 |
| 5,737,592 A | 4/1998 | Nguyen et al. .............. 395/604 |
| 5,742,778 A | 4/1998 | Hao et al. .................... 345/332 |
| 5,748,892 A | 5/1998 | Richardson .............. 395/200.3 |
| 5,754,830 A | 5/1998 | Butts et al. .................. 395/500 |
| 5,757,925 A | 5/1998 | Faybishenko ................. 380/49 |
| 5,758,085 A | 5/1998 | Kouoheris et al. ..... 395/200.61 |
| 5,761,507 A | 6/1998 | Govett ........................ 395/684 |
| 5,761,662 A | 6/1998 | Dasan |
| 5,764,908 A | 6/1998 | Shoji et al. ............. 395/200.47 |
| 5,764,915 A | 6/1998 | Heimsoth et al. ....... 395/200.57 |
| 5,767,849 A | 6/1998 | Borgendale et al. ......... 345/335 |
| 5,768,614 A | 6/1998 | Takagi et al. |
| 5,790,977 A | 8/1998 | Ezekiel |
| 5,794,207 A | 8/1998 | Walker et al. |
| 5,802,258 A | 9/1998 | Chen ..................... 395/182.08 |
| 5,802,306 A | 9/1998 | Hunt ..................... 395/200.58 |
| 5,812,784 A | 9/1998 | Watson et al. .......... 395/200.57 |
| 5,819,093 A | 10/1998 | Davidson et al. ............ 395/704 |
| 5,826,027 A | 10/1998 | Pedersen et al. ....... 395/200.51 |
| 5,828,840 A | 10/1998 | Cowan et al. .......... 395/200.33 |
| 5,838,906 A | 11/1998 | Doyle et al. ............ 395/200.32 |
| 5,838,910 A | 11/1998 | Domenikos et al. .... 395/200.33 |
| 5,838,916 A | 11/1998 | Domenikos et al. .... 395/200.49 |
| 5,842,206 A | 11/1998 | Sotomayor |
| 5,844,553 A | 12/1998 | Hao et al. .................... 345/329 |
| 5,848,410 A | 12/1998 | Walls et al. |
| 5,860,068 A | 1/1999 | Cook |
| 5,870,545 A | 2/1999 | Davis et al. ............. 395/200.31 |
| 5,874,960 A | 2/1999 | Mairs et al. ................. 345/340 |
| 5,877,757 A | 3/1999 | Baldwin et al. ............. 345/336 |
| 5,889,942 A | 3/1999 | Orenshteyn ............ 395/187.01 |
| 5,913,060 A | 6/1999 | Discavage ................... 395/680 |
| 5,913,920 A | 6/1999 | Adams et al. ............... 709/204 |
| 5,923,842 A | 7/1999 | Pedersen et al. ....... 395/188.01 |
| 5,928,324 A | 7/1999 | Sloan ......................... 709/203 |
| 5,930,804 A | 7/1999 | Yu et al. |
| 5,938,733 A | 8/1999 | Heimsoth et al. ........... 709/230 |
| 5,940,075 A | 8/1999 | Mutschler et al. |
| 5,941,949 A | 8/1999 | Pedersen .................... 709/227 |
| 5,941,988 A | 8/1999 | Bhagwat et al. ............. 713/201 |
| 5,944,791 A | 8/1999 | Scherpbier ................. 709/218 |
| 5,949,975 A | 9/1999 | Batty et al. ................. 709/213 |
| 5,951,694 A | 9/1999 | Choquier et al. ............. 714/15 |
| 5,961,586 A | 10/1999 | Pedersen .................... 709/201 |
| 5,973,696 A | 10/1999 | Agranat et al. .............. 345/357 |
| 5,978,847 A | 11/1999 | Kisor et al. ................. 709/227 |
| 5,978,848 A | 11/1999 | Maddalozzo, Jr. et al. .. 709/227 |
| 5,983,190 A | 11/1999 | Trower, II et al. |
| 5,999,179 A | 12/1999 | Kekic et al. ................. 345/349 |
| 5,999,950 A | 12/1999 | Krueger et al. .............. 707/535 |
| 6,023,721 A | 2/2000 | Cummings ................. 709/201 |
| 6,034,689 A | 3/2000 | White et al. ................. 345/357 |
| 6,038,696 A | 3/2000 | Baldwin et al. |
| 6,078,956 A | 6/2000 | Bryant et al. |
| 6,088,515 A | 7/2000 | Muir et al. .............. 395/200.47 |
| 6,108,712 A | 8/2000 | Hayes, Jr. ................... 709/246 |
| 6,157,944 A | 12/2000 | Pedersen .................... 709/204 |
| 6,157,953 A | 12/2000 | Chang et al. |
| 6,161,126 A | 12/2000 | Wies et al. .................. 709/203 |
| 6,167,432 A | 12/2000 | Jiang |
| 6,175,854 B1 | 1/2001 | Bretscher |
| 6,185,609 B1 | 2/2001 | Rangarajan et al. |

| | | | |
|---|---|---|---|
| 6,199,753 B1 | 3/2001 | Tracy et al. | |
| 6,263,363 B1 | 7/2001 | Rosenblatt et al. | |
| 6,272,493 B1 | 8/2001 | Pasquali | 707/10 |
| 6,272,556 B1 | 8/2001 | Gish | |
| 6,289,461 B1 | 9/2001 | Dixon | |
| 6,292,827 B1 | 9/2001 | Raz | 709/217 |
| 6,338,086 B1 | 1/2002 | Curtis et al. | |
| 6,374,237 B1 | 4/2002 | Reese | |
| 6,950,991 B2 * | 9/2005 | Bloomfield et al. | 715/738 |
| 2002/0035451 A1 | 3/2002 | Rothermel | |

FOREIGN PATENT DOCUMENTS

| | | | |
|---|---|---|---|
| EP | 0384339 | A3 | 8/1990 |
| EP | 0414624 | A2 | 2/1991 |
| EP | 0 475 581 | A2 * | 6/1991 |
| EP | 0475581 | A2 | 3/1992 |
| EP | 0483576 | A2 | 5/1992 |
| EP | 000475581 | A2 * | 12/1992 |
| EP | 0540151 | A2 | 5/1993 |
| EP | 0540151 | A3 | 5/1993 |
| EP | 0643514 | A3 | 3/1995 |
| EP | 0648038 | A2 | 4/1995 |
| EP | 0732834 | A2 | 9/1996 |
| EP | 0767563 | A2 | 4/1997 |
| EP | 0841615 | A2 | 5/1998 |
| EP | 0878759 | A1 | 11/1998 |
| JP | 06125363 | | 5/1994 |
| JP | 06332782 | | 12/1994 |
| WO | 93/15457 | A1 | 8/1993 |
| WO | 94/14114 | | 6/1994 |
| WO | WO-97/18518 | A | 5/1997 |
| WO | 97/28623 | A2 | 8/1997 |
| WO | 97/28623 | A3 | 8/1997 |
| WO | 98/52320 | A2 | 11/1998 |
| WO | 98/52344 | | 11/1998 |
| WO | WO-99/63430 | | 12/1999 |

OTHER PUBLICATIONS

D. Oliver, Netscape 2 Unleashed, Sams.net Publishing, pp. 261-263 (1996).
"Remote Desktop Environments Reflected in Local Desktop Windows," *IBM Technical disclosure Bulletin*, 36(3): 421-426 (Mar. 1993).
"Allocation of Equivalent Communication Buffer Sizes in SQLJRA Remote Protocol," *IBM Technical Disclosure Bulletin*, vol. 36, No. 1, pp. 29-31, Jan. 1993.
International Search Report, PCT/US03/03647, dated Apr. 29, 2003.
Abe et al.; Distributed Cooperative Control for Sharing Applications Based on the Mermaid Multiparty and Multimedia Desktop Conferencing System; NEC Research & Development; Jan. 1993; pp. 122-131.
Adler, "Distributed Coordination Models for Client/Server Computing," *Computer Magazine*, pp. 14-22, (Apr. 1995).
Application of Equivalent Communication Buffer Sizes in SQLJRA Remote Protocol; IBM Technical Disclosure Bulletin, vol. 36, No. 1, Jan. 1993; pp. 29-31.

Campbell, et al. "Meeting End-to-End QoS Challenges for Scalable Flows in Heterogeneous Multimedia Environments", Nov. 9, 1995; pp. 101-115.
Chu et al., Behavior Research Methods, Instruments & Computers; "Creating a Hypertext Markup Language Documents for an Information Server"; vol. 27, No. 2, pp. 200-205 (Jan. 1, 1995).
Davis; Database; "An Interactive Hypermedia Map Viewer"; vol. 18, No. 2, pp. 65-67 (Apr./May 1995).h.
Coulouris et al. "Distributed Systems Concepts and Design", second edition, University of London, Addison-Wesley 1994.
Droms "Dynamic Host Configuration Protocol," *Network Working Group Request for Comments*: 1541, pp. 1-39, (Oct. 1993).
Hoff van "Java and Internet Programming," *Dr. Dobb's Journal*, pp. 56, 58, 60-61, 101-102, (Aug. 1995).
Holtzman "Merge 386: Run Unix and DOS together on an 80386," *Byte*, pp. cover, 207-208, 211-212, (Dec. 1988).
IP Multicast Streamlines Delivery of Multicast Applications; Copyright 1995 © Cisco Systems, Inc.; pp. 1-5.
Herb, "The Animator Applet (1.0.2) -example 1," http://199.185.96.71/java/Animator/example1.html, printed Jun. 1, 1999.
Mann et al. "Terminal Servers on Ethernet Local Area Networks," *Digital Technical Journal*, No. 3, pp. 73-87, (Sep. 1986).
Multicast Routing; Copyright 1996 © Cisco Systems, Inc.; pp. 1-4.
OS/2 EE Database manager SQLJRA Remote Protocol, *IBM Technical Disclosure Bulletin*, vol. 36, No. 1, pp. 33-36, (Jan. 1993).
About Windows NT Networking, Chapter 5, Part 1, "Windows NT Browser"; pp. 79-87.
Liu et al. "Efficient Algorithms for Resource Allocation in Distributed and Parallel Query Processing Environments", pp. 1-5.
Putz "Interactive Information Services Using Word-Wide Web Hypertext", Computer Networks and ISDN Systems, Elsevier Science B.V., vol. 27, p. 273-280, 1994.
Schemers "Ibnamed: a load balancing name server written in Perl—Update," http://www-leland.stanford.edu/~docs/ibnamed/ibnamed.html, pp. 1-5, (Sep. 17, 1995).
Shashi Prasad; *Weaving a Thread*; Byte; Oct. 1995; pp. 173-174.
Singleton, A.; Byte; "Wired On The Web"; pp. 77-78, 80 (Jan. 1, 1996).
Tanenbaum, Computer Networks, Second Edition, pp. 434-435, Prentice Hall P T R, Englewood Cliffs, New Jersey.
Tessier; Dr. Dobb's Journal; "Using Javascript to Create Interactive Web Pages A Cross-Platform Object Scripting Language"; 21, No. 3:84-97 (Mar. 1, 1996).
Examiner's Report on European Patent Application No. 03 708 996.8—1243 (PCT/US2003/003647) dated Oct. 25, 2006.
Examiner's First Report on Australian Patent Application No. 2003212953 (PCT/US2003/003647) dated Mar. 29, 2007.
Anonymous, "Citrix Metaframe 1.8-Backgrounder", Internet Article, (Online), Apr. 24, 1999, available at: http://web.archive.org/web/19990424125017 and http://citrix.com/library/pdf/METAFRAME_BCKGRNDER.pdf.
EP 03 70 8996 (PCT/US 0303647) Supplementary European Search Report.

* cited by examiner

INTERACTING WITH SOFTWARE APPLICATIONS DISPLAYED IN A WEB PAGE

CROSS-REFERENCE TO RELATED APPLICATIONS

This application claims priority to co-pending U.S. patent application Ser. No. 09/086,898, filed May 29, 1998; co-pending U.S. patent application Ser. No. 08/855,977, filed May 14, 1997; co-pending U.S. patent application Ser. No. 09/247,220, filed Feb. 10, 1999; and co-pending U.S. patent application Ser. No. 10/068,461, filed Feb. 6, 2002, the entirety of which are incorporated herein by reference.

TECHNICAL FIELD

The present invention relates to the display of information in a communications network and more specifically to displaying the output of executing application programs in a web page.

BACKGROUND

Businesses in today's fast-paced global marketplace strive to improve their productivity and profitability by providing their employees with access to business-critical applications and data at fixed locations within the workplace as well as at mobile locations. The popularity of web-based computing, combined with the need to expedite information access for mobile users, has spurred adoption of enterprise portals. Enterprise portals are company web sites that aggregate, personalize and serve applications, data and content to users, while offering management tools for organizing and using information more efficiently. In some companies, portals have replaced traditional desktop software with browser-based access to a virtual workplace that is easy to use, convenient and ubiquitous. Companies that implement portals also benefit from a fast return on investment due to increased worker productivity and greater efficiency in their information technology infrastructure.

True desktop software replacement requires that a portal offer a full complement of information resources. Business applications are, arguably, the most vital information resource that workers need to access. Business applications also typically represent a major investment, and often a competitive advantage, which must not be lost when moving to web-based systems. From the standpoint of productivity, application access via the portal is needed so that users are not forced to switch back and forth between the browser and the desktop to do their work. With a split browser/desktop system, it is more difficult to locate and coordinate material from various sources. Users are also typically tied to the desktop device because it provides key applications that may not be accessible via the browser.

These business drivers provide compelling motivation to include existing and upcoming applications in portal implementations. However, few applications have been developed specifically for web-based delivery and those that have often provide reduced functionality as compared to their equivalent desktop applications. Although it is possible to use existing applications in a portal by re-engineering them for web publication using HTML, scripting, Java™ and other proprietary means, this approach is time-consuming and expensive and may delay portal implementation. Likewise, such implementations may experience reduced functionality and/or may not be feasible because the "download and run" model of application execution is too resource-intensive.

Accordingly, methods and systems are desired that enable efficient deployment of legacy applications in enterprise portals without undertaking expensive development efforts that may be marginally effective and which dilute the return on investment of the portal.

SUMMARY OF THE INVENTION

The present invention overcomes these shortcomings by applying web-enablement technology to legacy applications so that these applications remain in their original form, with the same user interface and full functionality to which their users are already accustomed, while allowing such viewers to interact with the applications via application-output windows displayed within a web page.

In one embodiment, the invention provides a method of displaying application-output data within one or more application-output windows positioned within a web browser window. The application-output data can be generated by a web enabled application program and/or a non-web enabled application program that is unmodified (e.g., so called "legacy applications"). The application programs that provide the source of the application-output data can reside on different application servers and the application-output data from these different application servers is displayed within one or more application-output windows in the same web browser window. In one aspect, the application-output windows are child windows of the web browser window. In one embodiment, the application-output windows are relocatable beyond the boundaries of the web browser window. In another aspect, window attribute information associated with the application-output windows is received via a first virtual channel and application-output data (e.g., graphical data) is received via a second virtual channel. In yet another aspect, the window attribute information of the application-output windows displayed within the web browser window is modifiable independently of the web browser that formed the web browser window. The invention displays the application-output data in the application-output window in accordance with the window attribute information.

In one embodiment, the invention provides a client agent that monitors and responds to events associated with the application-output windows, such as detecting a resize event input by a viewer of the web browser window and in response resizing an affected application-output window. The client agent performs these functions independently of the web browser. In one embodiment, the client agent is executed/instantiated in response to an application object (e.g., an ActiveX control) embedded in the web page displayed in the web browser window. In this embodiment, the client agent uses the window attribute information of the application-output windows received via the second virtual channel to modify at least one property of the application object, where the modified property triggers a corresponding change in the associated application-output windows. In a further aspect, the client agent establishes the first and second virtual channels independently of the web browser.

In this manner, the invention avoids expensive development and user training costs, and provides access to the full functionality of the original legacy application at mobile locations that have web access.

BRIEF DESCRIPTION OF THE DRAWINGS

The invention is pointed out with particularity in the appended claims. The advantages of this invention described above, and further advantages, may be better understood by reference to the following description taken in conjunction with the accompanying drawings, in which:

DETAILED DESCRIPTION

Figure 1:
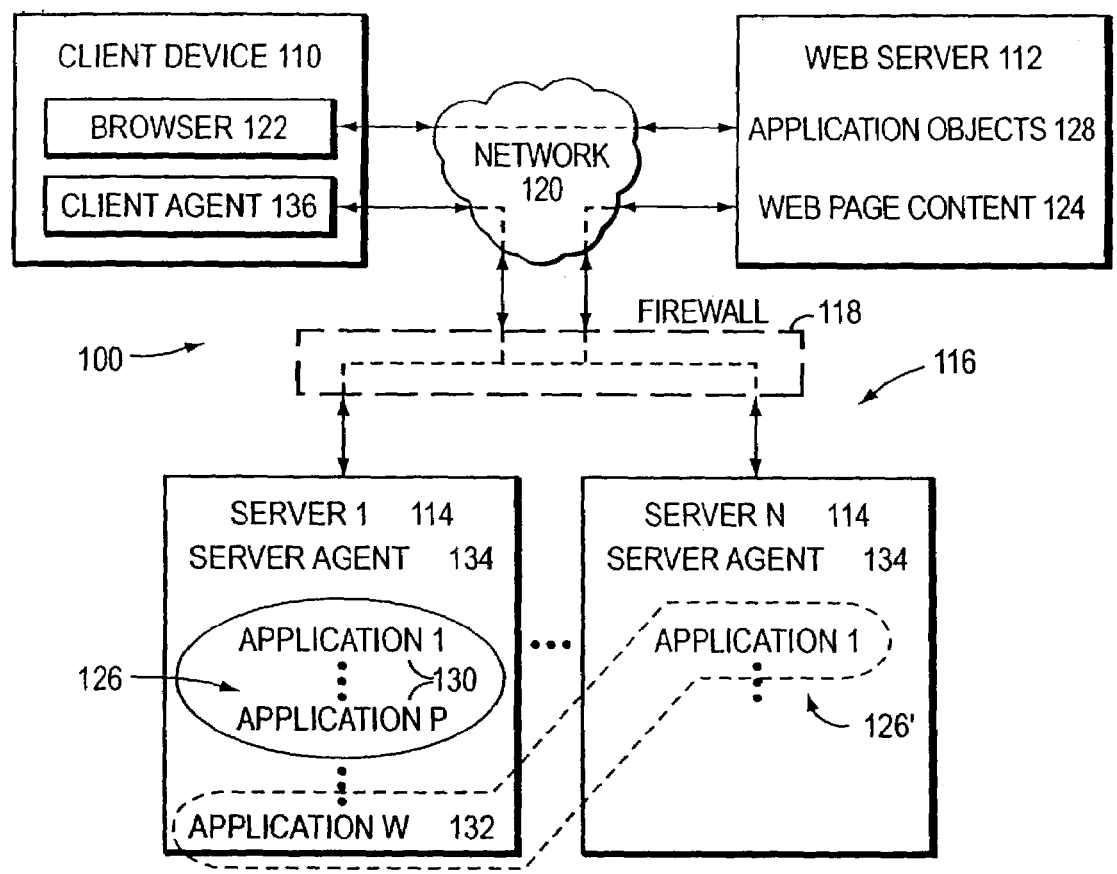
FIG. 1 schematically illustrates a client device, a web server, and a server farm connected via a data communications network, where a client agent on the client device and one or more server agents in the server farm operate in accordance with an embodiment of the invention.

Portals and other web-based implementations capable of displaying application-output data to remote users are, preferably, implemented using a server-based computing model. Server-based computing is analogous to enterprise portals, which improve user productivity through single-point access to information resources (e.g., application programs), in that server-based computing enhances the overall efficiency of the portal via single-point application administration.

In server-based computing models, application processing, administration, support and deployment are typically based on one or more central servers, which may be geographically distant from a user's display device. Remote users interact with particular applications hosted on these application servers by sending keystrokes, mouse movements, and other input/output actions to the application servers via data communication networks (e.g., LAN, MAN, WAN, Internet, Intranet, etc.) and receive screen/window updates, files and other data therefrom. Because much, if not all, of the application processing takes place on the server, the user's display device operates essentially as a thin client and thus requires few resources (e.g., processing power, nonvolatile memory, volatile memory, etc.) to display the application-output data of what may be a compute-intensive application. Further, by reducing the overall quantity of data that travels across the network, significant improvements can be realized in application performance and security.

Coupling this server-based computing model with web-based implementations of application programs (e.g., portals) enables users to access business critical applications on virtually any device connected to the web, including home computers, laptop computers, computer workstations, wireless and handheld communication devices, and information appliances running on a wide array of platforms. Device and platform flexibility allows mobile workers to move seamlessly from one device to another and receive a consistent, personalized information set, which includes access to the full functionality of business-critical, legacy applications.

In brief overview, a user of a device connected to the web requests access to one or more application programs from a web server. After authenticating the user's credentials, the web server accesses user-specific and application-specific parameters from a memory coupled to the web server. The web server subsequently communicates these parameters to one or more application execution servers hosting the requested application programs, and software processes operating on the application execution servers execute and initialize the requested application programs using the communicated parameters. In this manner, each instance of the application programs is personalized for a particular requesting user. The particular network addresses of the application execution servers hosting these personalized application programs are then forwarded to the user's device, which establishes a communications link and client-server session therewith.

Commands, events, graphical data, and window attribute information associated with the executing application programs are communicated between the user device and the application execution servers during the client-server session to ensure that the application-output data is displayed seamlessly on the desktop of the user device. Seamless display of the application-output data refers to the presentation of the data on the user desktop in a manner that is consistent with how locally-executing applications are presented and manipulated in the local desktop of the user device. In other words, a user views and interacts with the application-output data generated by the remote application programs as if the application programs were being executed locally.

In one embodiment, the output of the application programs is displayed in one or more application-output windows positioned within a web page displayed by a web browser of the user's device. In a further embodiment, the attributes of the application-output windows can be modified so that the application-output windows are moveable and resizeable within the boundaries of the web page. In another embodiment, the application-output windows initially appear within the boundaries of the web page and are subsequently moveable so that they are positioned outside the boundaries of the web page and thus give the appearance that the application-output windows correspond to locally-executing applications rather than to remotely-executing applications. In yet another embodiment, the application-output windows initially appear outside the boundaries of the web page and thus also appear to correspond to locally-executing applications. In one embodiment, the application output displayed in the application-output windows and the attributes of the application-output windows themselves are communicated and manipulated by software processes on the user's device and on the application execution servers, without involvement of the web server or web browser that initially provided access to the application programs.

In more detail and with reference to FIG. 1, a server-based computing architecture 100, capable of providing remote users with web-access to the full functionality of web and legacy applications (e.g., unmodified application programs that are not designed for web-based delivery), includes a client device 110 (e.g., any digital data processing device), a web server 112, one or more application execution servers 114 that are either standalone or clustered within a server farm 116 and which are preferably protected by a firewall 118, and a data communications network 120 (e.g., Internet, Intranet, etc.) that provides the necessary connectivity to enable each of these elements to communicate with each other.

Figure 2:
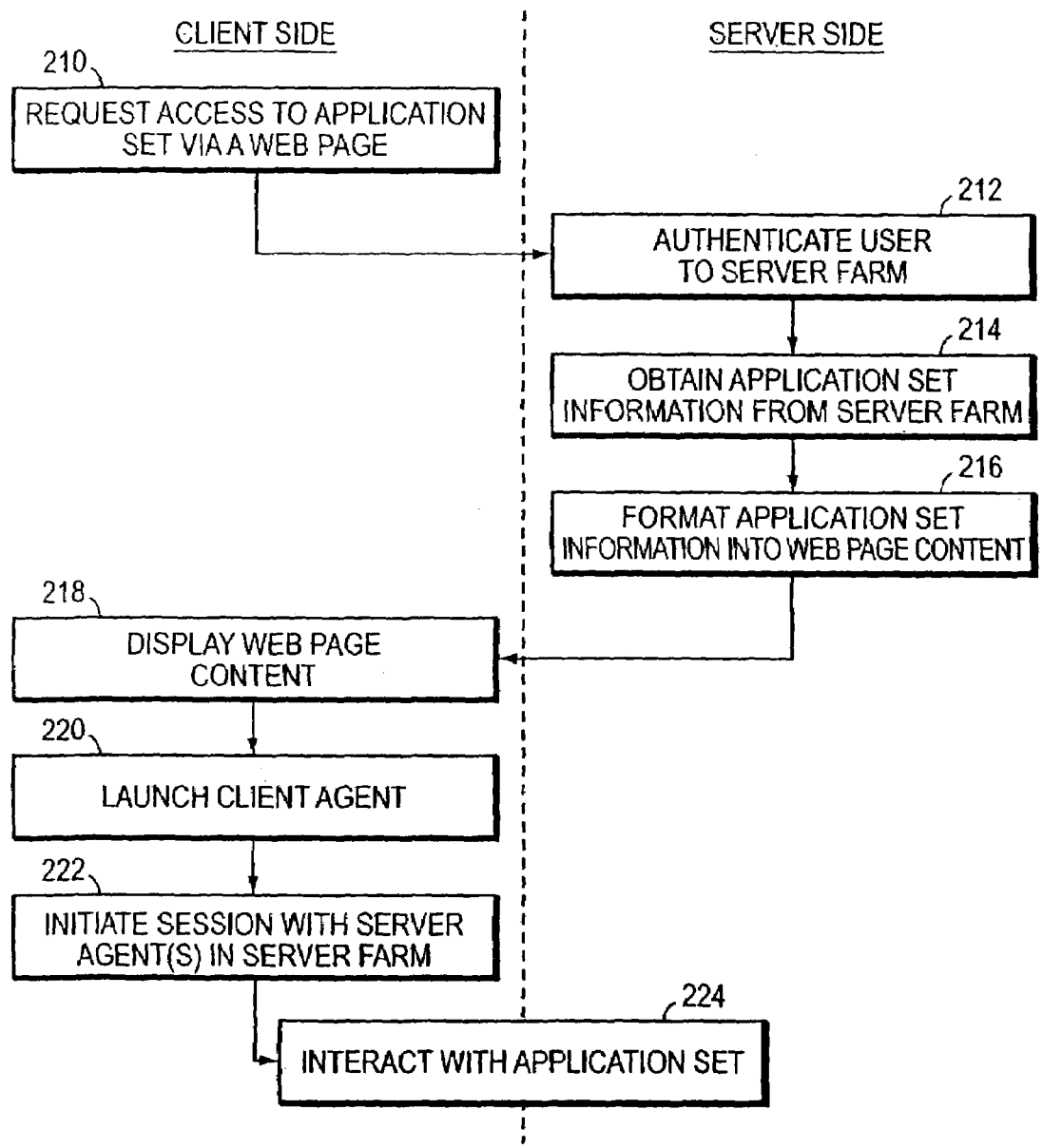
FIG. 2 provides a high-level flow diagram illustrating steps performed by the client agent and web server in accordance with an embodiment of the invention.

In operation and also with reference to FIG. 2, a user of the client device 110 directs a browser 122 executing on the client device 110 to submit a request for access to particular web page content 124 accessible via the web server 112 (step 210). In one embodiment, the user enters a universal resource locator ("URL") address into the browser 122. The URL is associated with the web page content 124 hosted by the web server 112 and the browser 122 responds by transmitting the request for access to the appropriate URL address. The web server 112 receives the request for access, which typically includes user credential information (e.g., user ID, password, group/project membership identifier, etc.), and authenticates the user to the server farm 116 or to the individual servers 114 that provide at least some of the web page content 124 (step 212).

The web server 112 authenticates the user by accessing an authentication process that compares the credentials entered by the user with previously-assigned credentials. In one embodiment, the authentication process and database of previously-assigned credentials are stored and maintained on the web server 112. In other embodiments, the previously-assigned credentials can be stored in the server farm 116, on individual application execution servers 114, and/or on an administrative server (not shown) that is coupled to the web server 112 via the Internet or other data communication network.

In the scenario where the web page content 124 corresponds to an enterprise portal, which provides access to an application set 126 (e.g., the set of application programs that have been personalized for the user by a portal administrator), the web server 112 accesses one or more application objects 128 (e.g., COM-compliant Java objects, ActiveX objects, HTML tags, etc.) that call web server-side scripts to authenticate the user (step 212) and/or to obtain the application set 126 information associated with the portal and user from the server farm 116 (step 214). The application objects 128 also include properties that are associated with the user and/or the particular applications 130 in the application set 126 that are provided via the portal. The user properties include, for example, group/project information that identifies the particular applications 130 and data that the user needs to access in order to allow the user to collaborate with other members of the group/project. The application properties include, for example, the user's preferences for each of the applications 130 in the application set 126.

The scripts called by the application objects 128 establish a network session between the web server 112 and the server farm 116 via, for example, a central administrative process (not shown), which monitors and controls each server 114 in the server farm 116. The administrative process selects one or more servers, which host the application programs 130 in the application set 126 specified by the application objects 128, based, for example, on a server and/or network performance basis. The desired application set 126 can be provided entirely by a single server 114 by selecting/allocating each application 130 in the application set 126 from a plurality of applications 130,132 hosted on the server 114. Alternatively, the application set 126' can be provided by a plurality of servers 114 with each of the plurality of servers 114 hosting at least one of the application programs in the application set 126'. A more detailed description of server farms and their administration/operation can be found in International Patent Application No. PCT/US01/14314, which is incorporated herein by reference in its entirety.

The administrative process launches one or more server agents 134 on the selected/allocated servers 114 in response to the scripts called by the application objects 128. Server agents 134 are software processes that execute, initialize, and interact with each of the application programs 130 in the application set 126 in accordance with the properties specified by the application objects 128. In one embodiment, there is a server agent 134 for each application program 130 in the application set 126. In other embodiments, there is a single server agent 134 for the application set 130, to the extent that all of the application programs 130 are hosted on the same server 114. In yet another embodiment, there is a single server agent 134 for each server 114. The server agents 134 then provide the output of the application programs 130 in the application set 126 as well as any other information relating to the application set 126 to the web server 112, which subsequently formats the application set information into the web page content 124 (step 216). The web page content 124 can include application icons corresponding to one or more of the application programs 130 in the application set 126 as well as application-output data from one or more of the application programs 130. In one embodiment, the application-output data provided by the application programs 130 corresponds to graphical data that is formatted to fit into a window, which exhibits attributes (e.g., window position on the web page, size, style, z-order, etc.) as initially specified by the properties of the application objects 128.

Figure 3:
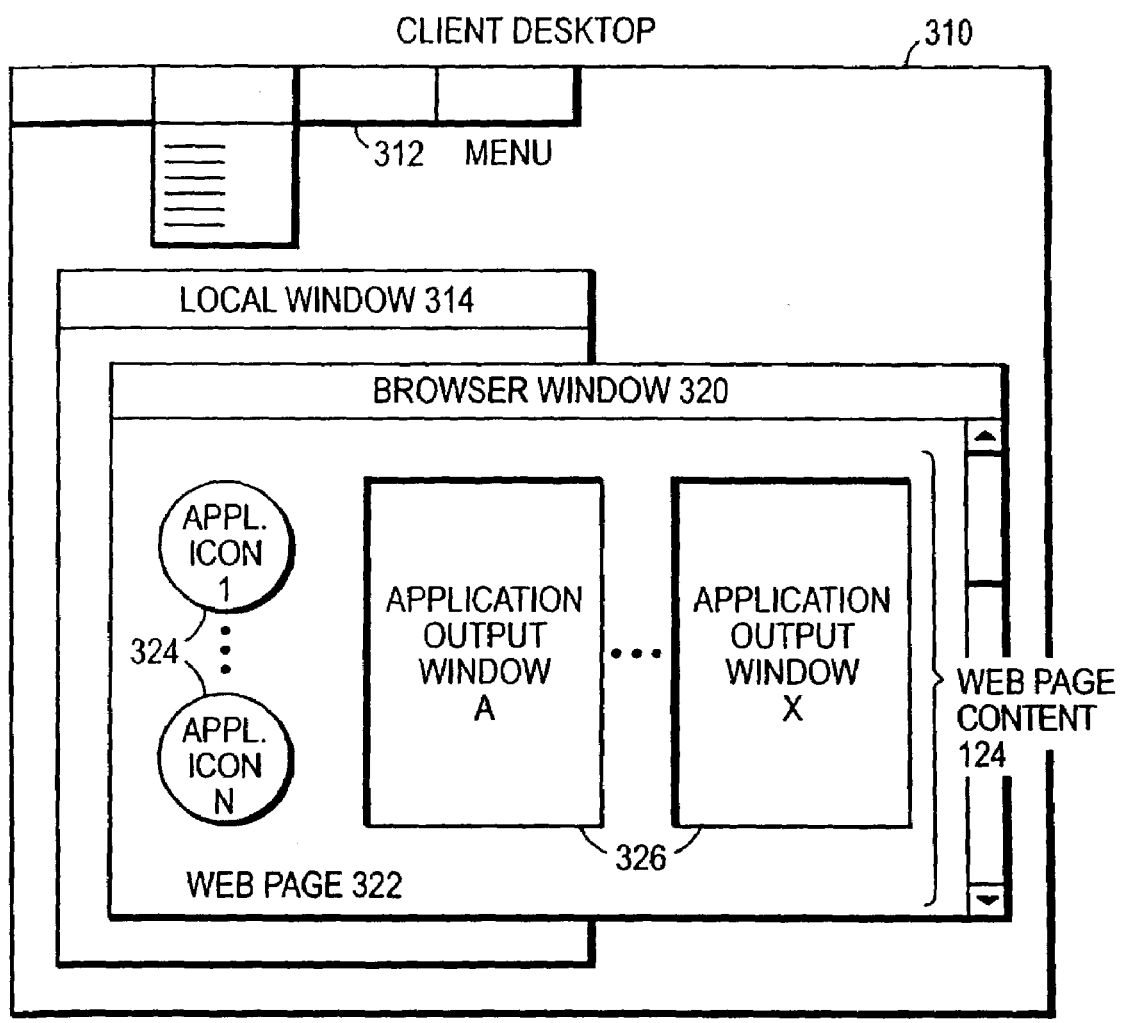
FIG. 3 is an illustrative screen representation of the client desktop, where the application-output windows displayed within the web browser window of the client desktop are formed in accordance with an embodiment of the invention.

In one illustrative embodiment and with reference to FIG. 3, the browser 122 receives and displays the web page content 124 within a browser window 320, which includes many possible graphical user interface ("GUI") elements (e.g., menu 312, local window 314, etc.) that form the client desktop 310 displayed on a display device coupled to the client device 110 (step 218). In this particular embodiment, the web page content 124 is displayed within a web page 322 displayed by the browser 320 and includes one or more application icons 324 and/or one or more application-output windows 326, which are associated with the application set 126. In one embodiment, one or more of the application objects 128 also form part of the web page content 124 of the web page 322 and can therefore set the initial attributes (size, z-order, position) of the application-output windows 326. The initial orientation, size, position, and z-order of each of the application-output windows 326 displayed on the web page 322 can be modified, as described below, so that the application-output windows 326 exhibit different orientations, sizes, positions, and z-orders relative to the web page 322 and/or relative to the client desktop 310.

The application objects 128 can be any data constructs which indicate to the browser 122 displaying the web page content 124 that an application-output window 326 should be displayed at a particular location in the web page 322. The application objects 128 may include additional information, such as the height, width, border style, background color or pattern in the application-output window 326, along with indicia of which applications 130 may be displayed in the window 326, how often the output display should be updated, or any other additional information that is useful to enhance the display of the application output.

In one illustrative embodiment, the application objects 128 are window tags that are embedded in an HTML file, examples of such tags are delineated below.

---

ActiveX tag

```
<object classid="clsid:238f6f83-b8b4-11cf-8771-00a024541ee3"
    data="/ica/direct.ica" CODEBASE="/cab/wfica.cab"
    width=436 height=295>
    <param name="Start" value="Auto">
    <param name="Border" value="On">
</object>
```

-continued

Netscape Plugin tag

```
<embed src="http://www.citrix.com/ica/direct.ica"
    pluginspage="http://www.citrix.com/plugin.html"
    height=295 width=436 Start=Auto Border=On>
<embed>
```

JAVA tag

```
<applet code=JICA.class width=436 height=295>
    <param name=Address         value="128.4.1.64">
    <param name=InitialProgram  value=Microsoft Word 7.0>
    <param name=Start           value=Auto>
    <param name=Border          value=On>
</applet>
```

In each case above, the tag indicates that an application-output window 326 having a height of 295 pixels and a width of 436 pixels should be drawn to receive output data from the application program 130. Each tag also specifies that the application program 130 should automatically start execution and that the application-output window 326 in which the application output is displayed should be drawn with a border. The ActiveX and Netscape Plugin tags have the properties of the remote application 130 specified in the file "direct.ica" located in the directory "/ica." The JAVA tag specifies the properties of the remote application 130 directly. In the example above, the address of the server 114 hosting the application program 130 is specified as well as the name of the application program 130 to be executed.

In one embodiment, the application program 130 executes substantially at the same time as the display of the web page 322. In another embodiment, the application program 130 executes when instructed to do so by the server agent 114, as part of providing web page content 124 to the web server 112. In yet another embodiment, the application program executes in response to a signal, such as a user-specified input (e.g., selecting an application icon 324 on the web page 322. Once execution of the application program 130 is commenced, the browser 122 instantiates a client agent 136 on the client device 110 (step 220). Alternatively, the client agent 136 is instantiated substantially at the same time as the display of the web page 322 or in response to user-specified inputs.

The client agent 136 comprises one or more software processes, which execute on the client device 110 and which are configured to interact with the server agent 134, browser 122, application-output window 326, and/or web server 112. In one embodiment, the client agent 136 is spawned as a child process of the browser 122. In other embodiments, the client agent 136 is a peer process of the browser 122 or a dynamically linked library associated with the browser 122. In one embodiment, a client agent 136 is instantiated for each application-output window 326 displayed in the web page 322. In another embodiment, a single client agent 136 is instantiated for one or more application-output windows 326 associated with a particular one of the application programs 130 in the application set 126. In yet another embodiment, a single client agent 136 is instantiated for each server agent 134, which contributed to the web page content 124. In yet another embodiment, a single client agent 136 is instantiated for the entire application set 126.

The browser 122 passes the properties of the application objects 128 relating to particular application programs 130 in the application set 126 to the client agent 136 associated with those same application programs 126. Additionally, the browser 122 may pass a handle for an application-output window 326 to the client agent 136 or the client agent 136 may query the browser 122 to retrieve the handle for the application-output window 326. Application properties, which are not specified by either the browser 122 or the application objects 128, may be set to default values. The client agent 136 may also have certain property defaults hard-coded, or the client agent 136 may access a file which contains property defaults.

The client agent 136 uses the name of the application program 130 and the address of the application execution server 114, which are both provided as part of the properties of the application objects 128, to establish a communications link and initiate a client-server session with the server agent 134 associated with the server 114 and application program 130 (step 222). The client agent 136 passes some or all of the properties of the application objects 128 to the server agent 134 along with any necessary default values. Alternatively, the server agent 134 may have already received some or all of the properties of the application objects 128 from the web server 112 prior to contributing to the web page content 124, which was subsequently displayed in the web page 322. If a particular property is not passed to the server agent 134, the server agent 134 may request it from the client agent 136 if it is a necessary property to which it has no default value (e.g., user ID) or the server agent 134 may provide its own default value for the property (e.g., execution priority).

The server agent 134 uses the properties received from the client agent 136 to authenticate the client agent 136 and to execute the desired application program 130 if it has not previously been started. Once the application program 130 is executing and the client agent 136 has been authenticated, the application program 130 communicates through the server agent 130 directly with the client agent 136, without intervention of the browser 122 or web server 112. The client agent 136 receives output data from the application program 130 and displays the output data in the appropriate application-output window 326 in the web page 322. The client agent 136 also detects input events, such as mouse clicks and keyboard inputs, associated with the application-output window 130 and forwards any such input events to the application program 130 via the server agent 134. This type of client-server session is repeated for each application program 130 in the application set 126 that is selected by the user and thus enables the user to interact with all of the resources in the application set 126 (step 224).

The data exchanged between the client agent 136 and server agent 134 during the client-server session includes not only input events and the graphical output data of the application program 130, but also window attribute information (e.g., window position, z-order, size, style, color, etc.). The window attribute information of the application-output windows 326 is initially specified by the application objects 128 embedded in the web page 322. For example, the application objects 128 can include an ActiveX control, which specifies and controls the window attributes of the application-output windows 326 during the client-server session. In one embodiment, the application-output windows 326 exhibit the same dimensions as the corresponding ActiveX controls.

The client agent 136 communicates the initial window attributes of the local application-output windows 130 to the server agent 134 along with information relating to the client desktop 310 (e.g., size, resolution, etc.). The server agent 134 responds by conforming the size of its server desktop to that of the client desktop 310 and by conforming the window attributes of local server windows to those of the application-output windows 326 on the client desktop 310. The application-output windows 326 on the client desktop 310 and the server windows on the server desktop thus exhibit the same window attributes and display the same graphical output data that is generated by the application 130. Note that the server desktop can correspond to either an offscreen surface contained within the server's video memory or to an onscreen surface displayed on a display device coupled to the server 114.

The user of the client device 110 can move, resize, and/or alter the z-order or other initial window attributes of the application-output windows 326 during the client-server session, by entering an input event that is detected by the client agent 136 and then communicated to the server agent 134. The server agent 134 conforms its desktop and/or windows to be consistent with the input event and then transmits updated graphical output data and window attribute information, corresponding to the input event, to the client agent 136 with instructions to update the application-output windows 326 so that they match the windows on the server 114.

For example, if the user of the client device 110 resizes one of the application-output windows 326 from that originally specified by the application objects 128 (such as by clicking with the mouse and dragging the border of the application-output window 326 to the desired location/size), the client agent 136 detects the input event generated by the mouse action and communicates it to the server agent 134, which effects the same resize event in the on or offscreen surfaces of the server 114. The server agent 134 then sends repaint and resize command messages to the client agent 136 along with updated graphical output data and window attribute information. In response, the client agent 136 modifies the appropriate application object 128 affected by the resize event (e.g., the ActiveX control discussed above) so that the corresponding application-output window 326 is resized and the updated graphical output data is painted within the borders of the application-output window 326.

Figure 4:
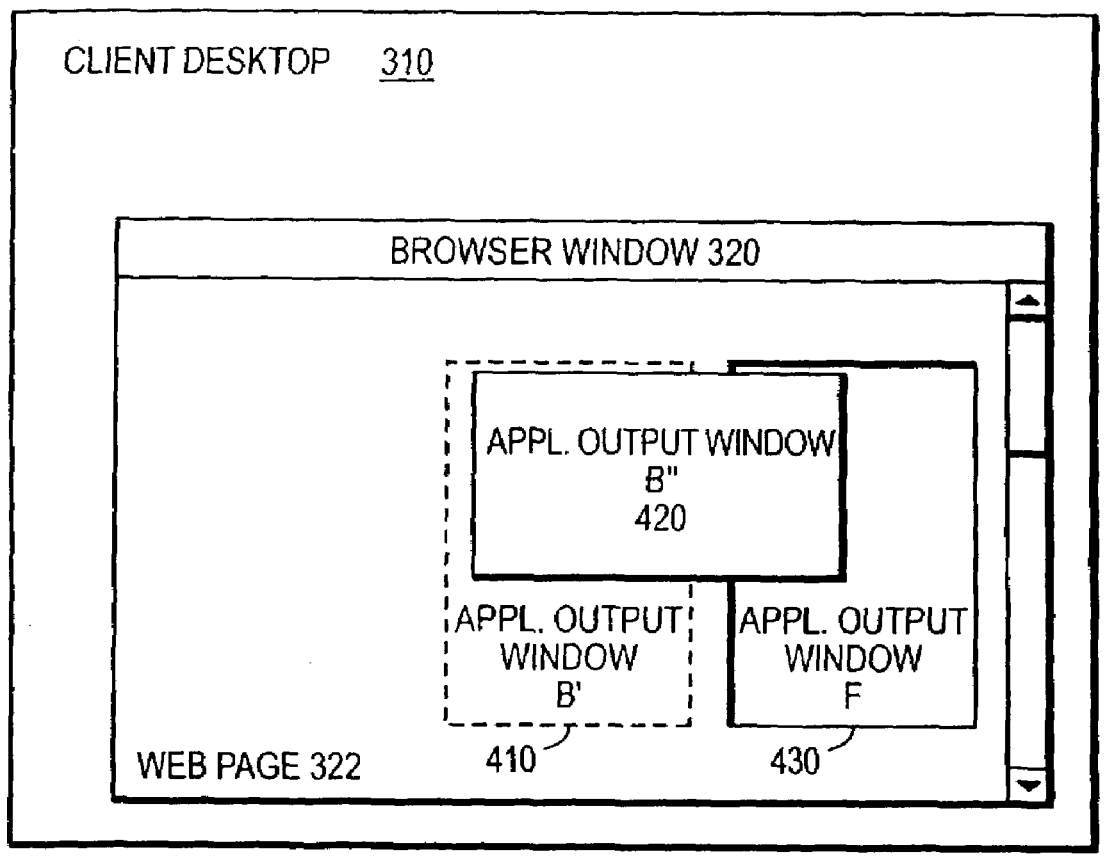
FIG. 4 is a screen representation of the application-output windows of FIG. 3, illustrating that application-output windows can be moved and/or resized within the web browser window in accordance with an embodiment of the invention.
Figure 5:
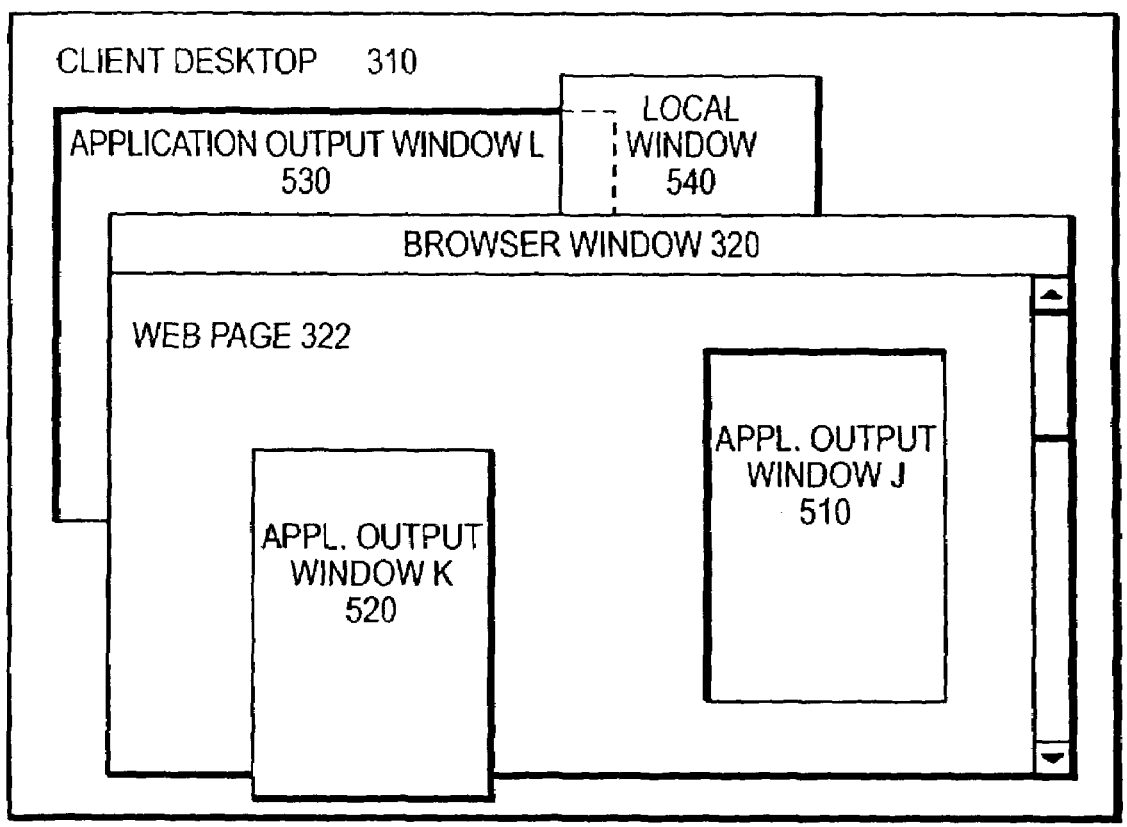
FIG. 5 is a screen representation of the application-output windows of FIG. 3, illustrating that the application-output windows can be displayed within and/or beyond the boundaries of the web browser window and can exhibit varying z-orders, in accordance with an embodiment of the invention.

The invention thus enables the window attributes of the application-output window 326 to be modified so that the application-output window 326 can be moved, resized, etc., within the boundaries of the browser window 320. With reference to FIG. 4 and by way of nonlimiting example, application-output window B' 410 can be resized using the methodology described above to form application-output window B" 420, which overlaps (thus exhibiting a different z-order from) application-output window F 430. Alternatively, the application-output window 326 can be moved or resized to extend beyond or be entirely outside of the browser window 320. By way of nonlimiting example and with reference to FIG. 5, application-output window J 510 lies within the boundaries of the browser window 320, while application-output window K 520 extends beyond the boundaries of the browser window 320 and application-output window L 530 is entirely outside the browser window 320. Note that the application-output windows can exhibit varying z-orders with respect to other elements in the client desktop 310. For example, local window 540 exhibits a z-order between that of the browser window 320 and application-output window L 530. In this embodiment, the client agent 136 instructs the operating system of the client device 110 to draw the desired application-output window 326 in response to command messages received from the server agent 134, without having to first modify the properties of the application objects 128 embedded in the web page 322, which initially established the window attributes of the application-output window 326.

In one embodiment, each input event affecting the application-output window 326 is transferred to and processed by the server agent 114, which then instructs the client agent 136 to effect corresponding changes in the application-output window 326. In another embodiment, one or more input event types (e.g., click and drag mouse actions directed at moving the application-output window 326 to another grid location on the web page 322) are processed entirely by the client agent 136 and not reported to the server agent 134, where the graphical output data displayed within the application-output window 326 remains unchanged.

Figure 6:
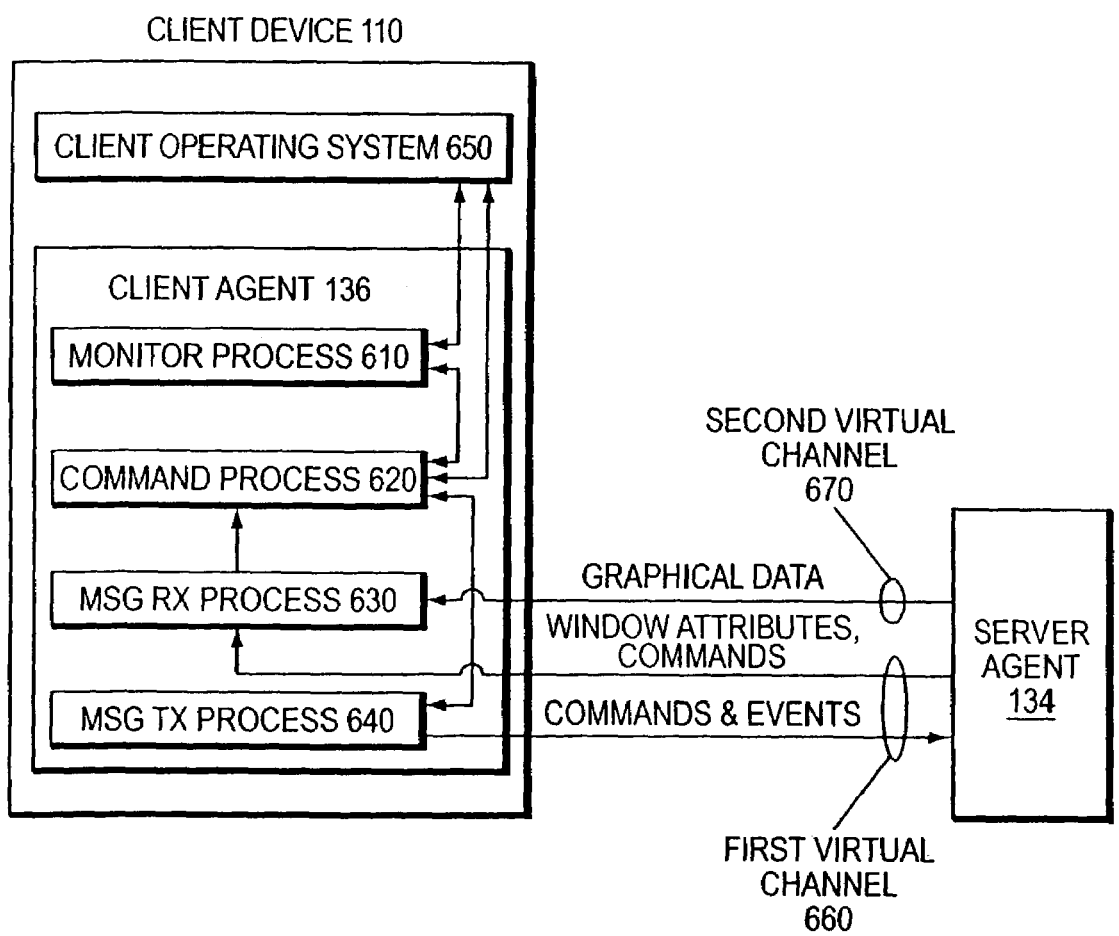
FIG. 6 schematically illustrates the processes of the client agent and the type of data that is transferred between the client agent and the server agents, in accordance with an embodiment of the invention.

In more detail and with reference to FIG. 6, the client agent 136 comprises a monitor process 610, a command process 620, a message receiving process 630, and a message transmission process 640. In one embodiment, each process 610, 620, 630, 640 is a separately functioning code segment that operates independently of the other processes. For example, the message receiving process 630 and the command process 620 can be implemented as separate threads, which communicate with each other via a named pipe or shared memory. Use of a common data set allows the message receiving process 630 and the message transmission process 640 to be synchronized.

The message receiving process 630 receives graphical data, window attribute information, and commands from the server agent 134 via the communications link that provides the connectivity between the client agent 136 and server agent 134 during the client-server session. The communications link preferably includes a first virtual channel 660 and a second virtual channel 670. Command, event, and window attribute information is passed between the client agent 136 and the server agent 134 via the first virtual channel 660, while graphical data corresponding to the graphical contents of the application-output windows 326 is passed via the second virtual channel 670. The message receiving process 630 informs the command process 620 of the commands, window attributes, and graphical data received from the server agent 134 and the command process 620 further processes this data.

In one embodiment, the command process 620 processes the commands received from the server agent 134 by instructing the client operating system 650 to form and/or modify affected application-output windows 326 in accordance with the window attributes specified by the server agent 134. The command process 620 also instructs the client operating system 650 to display the graphical data provided by the server agent 134 in the appropriate application-output windows 326. In one embodiment, the command process 620 implements changes to the application-output windows 326 in the client desktop 310 by issuing GDI commands. In other embodiments, the command process 620 issues commands directly to an associated graphics subsystem or via graphics API commands.

The command process 620 also instructs the monitor process 610 to periodically monitor the client desktop 310 in order to detect changes affecting the application-output windows 326. In one embodiment, the monitor process 610 instructs the client operating system 650 to return information relating to the client desktop 310 at predetermined polling intervals. In other embodiments, the monitor process 610 monitors the message queue maintained by the client operating system 650 in order to detect changes affecting the application-output windows. The monitor process 610 communicates some or all of the detected desktop changes to the command process 620 for further processing.

In one embodiment, the command process 620 instructs the message transmission process 640 to transmit all of the changes detected by the monitor process 610 to the server agent 134 via the first virtual channel. In another embodiment, the command process 620 instructs the message transmission process 640 to transmit a subset of the detected changes, such as changes which only affect the graphical data and/or window attributes of the application-output windows 326. The server agent 134 receives the detected changes along with any commands from the command process 620 and any input events made by the user of the client device 110 that triggered the detected changes. The server agent 134 then modifies its local desktop to accommodate the detected changes and transmits associated commands, window attributes, and graphical data back to the client's message receiving process 630. In this manner, the present invention ensures that desktop elements, such as the application-output windows 326, that are common in the client and server desktops remain in lock step.

The command process 620 of the client agent 136 ensures that analogous/common elements in the client and server desktops remain in lock step by maintaining a common window list. The common window list includes the window attribute information for each window in the client desktop 310 and for each corresponding window in the server desktop. In embodiments, in which a plurality of client agents are executing on the client device 110, the command process 620 of a single client agent 136 has primary responsibility for maintaining the common window list. If the single client agent 136 terminates, while other client agents remain in operation, the remaining client agents will elect another primary client agent to maintain the common window list.

The present invention also enhances the performance of the client-server session by preferably using the techniques described in co-owned, International Patent Publication No. WO 01/92973, which is incorporated herein by reference, to reduce the amount of graphical data transmitted between the client and server agents. In one embodiment, the invention encodes the data into relatively small representations that repeat within the protocol stream transmitted between the client agent 136 and the server agent 134. In this manner, the invention minimizes the size of each discrete data element that must be transmitted and increases the repeatability of the data within the protocol stream so that compression algorithms that operate more efficiently on repetitive encoded data can realize a greater degree of compression efficiency. The invention uses a number of techniques to realize this enhanced compression, including the following: scanning a command queue for later-issued commands which supercede earlier-issued commands; disk-caching techniques that improve compression of data that has been previously encountered during a client-server session; transmission of relative coordinates using quantized regions to avoid sending both endpoints and/or the angle of an associated strip (i.e., series of consecutive pixels exhibiting a common angle); and manipulation of off-screen surfaces to enhance performance during the client-server session. The invention also reduces the frequency of overscroll problems encountered when there is a performance mismatch between a fast server and a relatively slow network or client device.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A system for incorporating at least one remote window from a remote desktop environment into a local desktop environment comprising:
   a first virtual channel coupled to a remote desktop environment and conveying window attribute data associated with a remote window present on the remote desktop environment;
   a second virtual channel coupled to the remote desktop environment and receiving application-output data produced by an application program executing in the remote desktop environment; and
   a client agent coupled to the remote desktop environment via the first and second virtual channels, the client agent:
      establishing a communications link, independent from a browser application, with the application program executing on the remote desktop environment;
      receiving for display, without intervention by the browser application, application output produced by the application program via the second virtual channel; and
      directing the formation of an application-output window for displaying the received application-output data, the application-output window being formed at least partially outside the boundaries of a browser window in the local desktop environment in accordance with the window attribute data conveyed by the first virtual channel.

2. The system of claim 1, wherein the client agent further comprises establishing a communication link that is independent from the browser application between the application program executing on the remote desktop environment and the application window using a window parameter, by which the application output passes from the application program executing on the remote desktop environment to the application-output window without intervention by the browser application.

3. The system of claim 1, wherein the first virtual channel further comprises receiving window attribute data modifiable independently of the web browser.

4. The system of claim 1, wherein the client agent further comprises monitoring and responding to events associated with the application-output window.

5. The system of claim 1, wherein the client agent resizes the application-output window in response to an input received by the client agent.

6. The system of claim 1, wherein the client agent forms the first and second virtual channels independently of the web browser.

7. The system of claim 1, further comprising an unmodified application program generating the application-output data.

8. The system of claim 1, further comprising;
   an application object embedded in a web page displayed in the web browser window, the application object including at least one property affecting the application-output window; and
   a client agent instantiated in response to the application object and capable of modifying the property of the application object upon receipt of the window attribute information from the second virtual channel.

9. The system of claim 8 wherein the application object is an ActiveX control.

10. The system of claim 1 wherein the application-output window is a child window of a web browser window.

11. The system of claim 1 further comprising a plurality of application-output windows positioned within the web browser window, each of the application-output windows displaying application-output data received from a different application server.

12. The system of claim 1 further comprising a combined windows list being formed and maintained by the client agent, the combined windows list representing a modifiable z-order of the application-output window in the local desktop environment.

13. The system of claim 1 wherein the window attribute data associated with the remote window and conveyed by the second virtual channel includes the size and z-order of the remote window.

14. The system of claim 1 further comprising a local operating system forming the local desktop environment, the client agent periodically polling the local operating system to detect an attribute change in the corresponding window, wherein the client agent transmits a message to the remote desktop environment indicative of the attribute change.

15. The system of claim 1 wherein the application-output window exhibits window attribute data substantially similar relative to the local desktop environment as the window attribute data of the remote window relative to the remote desktop environment.

16. The system of claim 1 further comprising a plurality of communication links coupling the local desktop environment with a plurality of remote desktop environments, the communication links including first and second virtual channels conveying graphical and window attribute data associated with remote windows from the plurality of remote desktop environments to the client agent, wherein the client agent forms application-output windows in the local desktop environment corresponding to each of the plurality of remote windows.

17. A method for incorporating at least one remote window from a remote desktop environment into a local desktop environment, the method comprising:
(a) establishing, by a client agent, a communications link independent from a browser application, with an application program executing on a remote desktop environment;
(b) sending, by the client agent, commands to the remote desktop environment to begin execution of the application program;
(c) receiving, by a first virtual channel coupled to the remote desktop environment window and independent of the browser application, attribute data associated with a remote window present on the remote desktop environment;
(d) receiving, by a second virtual channel coupled to the remote desktop environment, application-output data, the second virtual channel independent of the browser application; and
(e) directing, by the client agent coupled to the remote desktop environment via the first and second virtual channels, the formation of an application-output window for displaying the received application-output data, the application-output window being formed at least partially outside the boundaries of a browser window in the local desktop environment in accordance with the window attribute data conveyed by the first virtual channel.

18. The method of claim 17 further comprising the step of monitoring and responding, by the client agent, to events associated with the application-output window, independently of the web browser.

19. The method of claim 17 further comprising the resizing, by the client agent, the application-output window in response to an input received by the client agent.

20. The method of claim 17 further comprising the step of forming a combined windows list storing at least some of the window attribute data.

21. The method of claim 17 further comprising the step of establishing, independently of the web browser, the first and second virtual channels.

22. The method of claim 17 further comprising the steps of receiving application-output data generated by an unmodified application program.

23. The method of claim 17 further comprising the step of executing a client agent in response to an application object embedded in a web page displayed in the web browser window, the client agent establishing the first and second virtual channels independently of the web browser.

24. The method of claim 17 further comprising the step of using the received window attribute data to modify at least one property of the application object, the modified property at the application object triggering a corresponding change in the application-output window.

25. The method of claim 17 further comprising the step of executing a client agent in response to an ActiveX control embedded in a web page displayed in the web browser window, the client agent establishing the first arid second virtual channels independently of the web browser.

26. The method of claim 17 further comprising the step of providing a plurality of application-output windows positioned at least partially outside the boundaries of a browser window, each of the application-output windows displaying application-output data received from a different application server.

27. The method of claim 17 further comprising the steps of:
polling a local operating system associated with the local desktop environment to detect an attribute change in the corresponding window; and
transmitting a message to the remote desktop environment indicative of the detected attribute change.

28. The method of claim 17 wherein the application-output window exhibits window attribute data substantially similar relative to the local desktop environment as the window attribute data of the remote window relative to the remote desktop environment.

29. A method for incorporating at least one remote window from a remote desktop environment into a local desktop environment and displaying application-output data in the local desktop environment, the method comprising:
(a) transmitting application-output data associated with the remote window via a first virtual channel coupled to the local desktop environment;
(b) transmitting window attribute data associated with the remote window via a second virtual channel coupled to the local desktop environment; and
(c) transmitting messages to the local desktop environment directing the formation of a application-output window in the local desktop environment, the application-output window displaying the application output transmitted via the second virtual channel in accordance with the window attribute data transmitted via the first virtual channel.

30. The method of claim 29 further comprising the step of forming a combined windows list storing at least some of the window attribute data in response to the transmitted messages.

31. The method of claim 29 further comprising the steps of:
polling a remote operating system associated with the remote desktop environment to detect an attribute change in the remote window; and
transmitting a message to the local desktop environment indicative of the detected attribute change.

* * * * *